(12) United States Patent
Le Naour et al.

(10) Patent No.: US 9,124,340 B2
(45) Date of Patent: Sep. 1, 2015

(54) WIDEBAND TRANSCEIVER DEVICE FOR TRANSMITTING AND RECEIVING SIGNALS FROM A CHANNEL SELECTED IN DYNAMICALLY SPREAD BANDWIDTH

(75) Inventors: Jean-Yves Le Naour, Pace (FR); Jacques Perraudeau, Betton (FR); Vincent Demoulin, Montfort sur Meu (FR)

(73) Assignee: Thomson Licensing (FR)

( * ) Notice: Subject to any disclaimer, the term of this patent is extended or adjusted under 35 U.S.C. 154(b) by 169 days.

(21) Appl. No.: 13/392,512

(22) PCT Filed: Aug. 27, 2010

(86) PCT No.: PCT/FR2010/051791
§ 371 (c)(1),
(2), (4) Date: Feb. 24, 2012

(87) PCT Pub. No.: WO2011/023917
PCT Pub. Date: Mar. 3, 2011

(65) Prior Publication Data
US 2012/0183096 A1    Jul. 19, 2012

(30) Foreign Application Priority Data
Aug. 28, 2009  (FR) .................................. 09 55912

(51) Int. Cl.
H04B 1/38  (2006.01)
H04B 1/18  (2006.01)
H04B 1/00  (2006.01)

(52) U.S. Cl.
CPC .................. *H04B 1/18* (2013.01); *H04B 1/006* (2013.01); *H04B 1/0032* (2013.01)

(58) Field of Classification Search
USPC ............................................ 455/73
See application file for complete search history.

(56) References Cited

U.S. PATENT DOCUMENTS

| 7,133,646 | B1 | 11/2006 | Miao |
| 7,245,882 | B1* | 7/2007 | McFarland ...................... 455/73 |
| 2002/0113725 | A1 | 8/2002 | Katoh |
| 2003/0138032 | A1 | 7/2003 | Shi et al. |
| 2004/0002361 | A1 | 1/2004 | Kermalli |
| 2004/0038660 | A1 | 2/2004 | He et al. |
| 2005/0254561 | A1 | 11/2005 | Seo et al. |
| 2006/0223515 | A1 | 10/2006 | Hermel et al. |

(Continued)

FOREIGN PATENT DOCUMENTS

| CN | 1477789 | 2/2004 |
| CN | 1538625 | 10/2004 |

(Continued)

OTHER PUBLICATIONS

Rohde et al., "Low noise, low power consumption, configurable, and adaptable ultrawideband VCOs", 2006 IEEE International Conference on Ultra-Wideband, (2006), pp. 545-550.

*Primary Examiner* — Ajibola Akinyemi
(74) *Attorney, Agent, or Firm* — Jack Schwartz & Associates, PLLC

(57) ABSTRACT

The proposed process makes it possible to noticeably and dynamically increase the operational frequency band of a wideband emission/reception device without performance degradation, this thanks to the implementation of a particular architecture and a judicious distribution of the technical constraints over the analogue and digital sub-assemblies of a user terminal.

10 Claims, 6 Drawing Sheets

(56) References Cited

U.S. PATENT DOCUMENTS

| | | |
|---|---|---|
| 2008/0214137 A1 | 9/2008 | Qian |
| 2008/0242346 A1 | 10/2008 | Rofougaran et al. |

FOREIGN PATENT DOCUMENTS

| | | |
|---|---|---|
| CN | 1625065 A | 6/2005 |
| EP | 1816752 | 8/2007 |
| EP | 1947774 | 7/2008 |
| JP | 2003018038 | 1/2003 |
| TW | 566012 | 12/2003 |
| WO | WO02/075942 | 9/2002 |
| WO | WO03/021804 | 3/2003 |
| WO | WO03/061174 | 7/2003 |
| WO | WO2005/088847 | 9/2005 |
| WO | WO2005/112566 | 12/2005 |
| WO | WO2008/015687 | 2/2008 |

\* cited by examiner

Fig. 1 – PRIOR ART

Fig. 2 - PRIOR ART

WIDEBAND TRANSCEIVER DEVICE FOR TRANSMITTING AND RECEIVING SIGNALS FROM A CHANNEL SELECTED IN DYNAMICALLY SPREAD BANDWIDTH

This application claims the benefit, under 35 U.S.C. §365 of International Application PCT/FR2010/051791, filed Aug. 27, 2010, which was published in accordance with PCT Article 21(2) on Mar. 3, 2011 in English and which claims the benefit of French patent application No. 0955912, filed Aug. 28, 2009.

The invention relates to a wideband emission/reception device enabling the emission and reception of a channel selected in a dynamically extended passband In the field of wireless telecommunications, the growing increase in the number of standards (GSM, UMTS, WiFi, GPS, DVBT/H, WIMAX, etc.), of users, and of proposed services makes the management of the radio frequency spectrum increasingly difficult.

For many economic entities in the world, one of the solutions consists in accelerating the advent of software-defined radio systems. The promises of this technology in terms of interoperability and flexibility represent a major advance for the telecommunication systems of tomorrow. The wireless emission and reception systems should thus be capable to adapt and reconfigure themselves in real time to adapt themselves to one or more given applications.

The current technological resources do not enable to carry out the ideal project of software Radio, but the manufacturers develop software solutions known as 'Software Defined Radio' (SDR) of restricted software-defined radio, which enable all the same to use the fact that the baseband processing is programmable and thus to use processors dedicated to signal processing. The SDR software solution is therefore interesting when the aim is to develop multi-function, multi-standard and therefore multi-service terminals.

The invention falls within this scope and more particularly in the case of multi-application mobile terminals. The frequency bands allocated for these applications will be very variable from a continent to another and even from a country to another whence the interest of flexibility to select the frequencies in a wide frequency range without changing the user terminal or 'hardware'.

Figure 1:
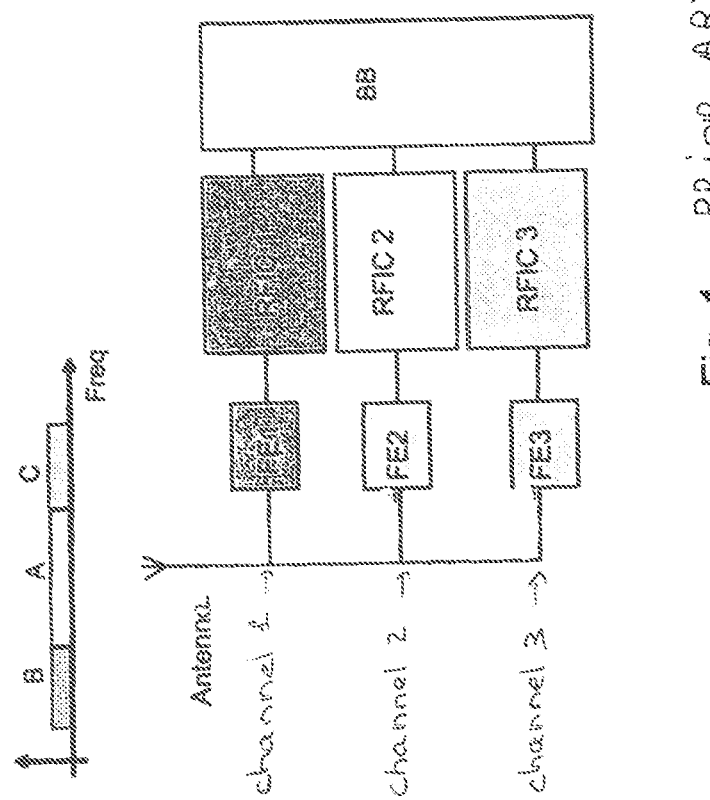

FIG. 1 illustrates a state of the art. This involves addressing several frequency bands A, B and C corresponding to distinct applications. The emission/reception terminals are thus made up of several reception channels, channel 1 to channel 3, placed in parallel and constructed around several integrated RF elements RFIC1 to RFIC3 associated with front-end elements FE1 to FE3 (FE for Front End) of an antenna or antenna array for each of the channels 1 to 3. The emission/reception signals are processed by a BB baseband processing circuit. The assembly is dedicated to a given application and covers a limited frequency band A, B or C. The integrated RF elements RFIC1 to RFIC3 integrate several VCO oscillators each covering an elementary frequency sub-band. These elementary VCO oscillators are then switched to cover the entire band to be addressed by the RFIC element making the RF component as well as its implementation more complex. It must be noticed that a large number of components is implemented, thus limiting the phase noise performance of the oscillators, or increasing the size and the complexity of the terminal, its cost and its consumption.

Figure 2:
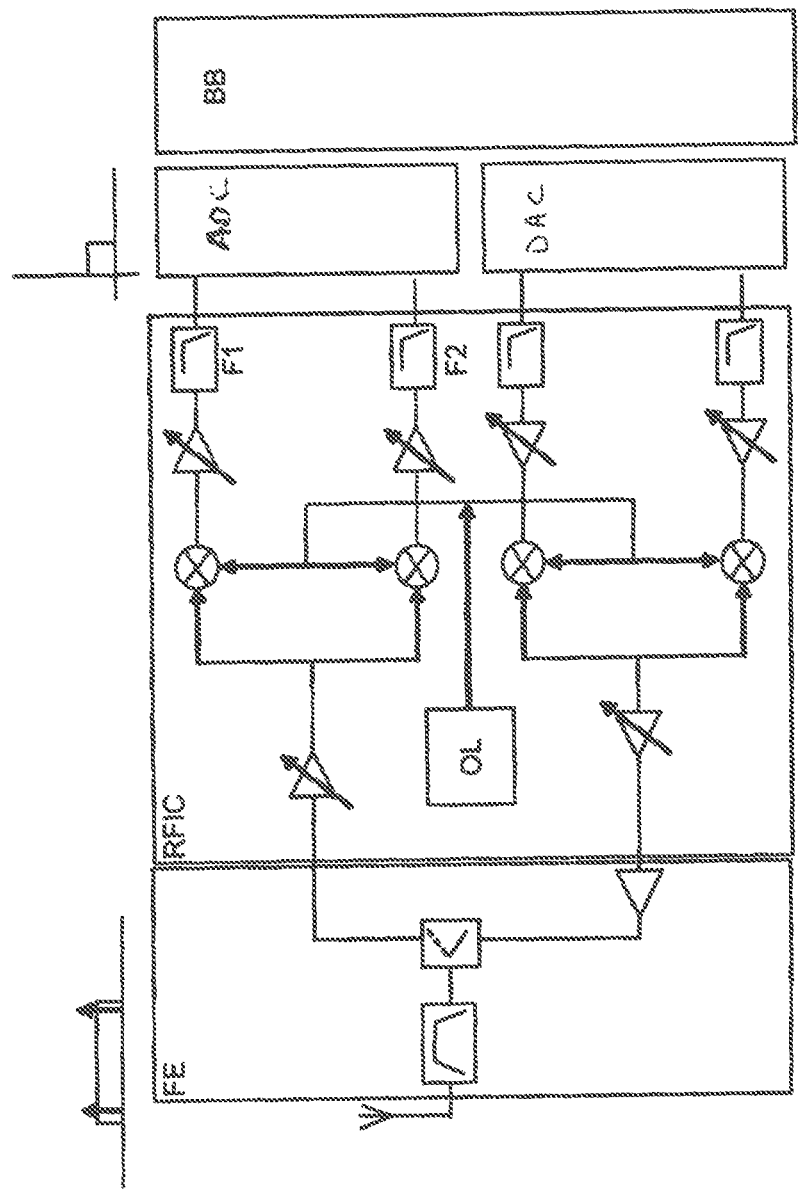

FIG. 2 illustrates an example of architecture for an emission/reception terminal commonly used and of the direct conversion type associated with a FE front-end element and enabling to cover several frequency bands. A single local oscillator OL is used and covers all the frequency bands. An adjustable low-pass filtering F1, F2 is integrated into the RFIC element for channel filtering before sampling. The baseband processing circuits comprise a baseband BB processor circuit associated with an Analogue-to-Digital ADC converter for the reception, a Digital-to-Analogue converter DAC for the emission and it must also be noticed that a large number of components is implemented The U.S. Pat. No. 7,245,882 B1 also relates to a radio frequency emission reception device enabling a determined frequency band to be selected.

The device comprises a RF filtering circuit configured to dynamically choose a given frequency band among several frequency bands The filtering circuit is made up of band-pass filters and is positioned between the antenna and the receivers to minimize in particular the interference problems.

The present invention aims at remedying the disadvantages of the devices described above, and at enabling the operating band of an emission—reception device operating in a determined frequency band known as nominal band to be widened.

The invention consists in an emission reception device comprising a front-end module, a frequency conversion module and an analogue-to-digital and digital-to analogue conversion and baseband processing module for the emission or reception of signals in a selected channel.

The front-end module which comprises a filtering element comprising at least a first low-pass filter, a second high-pass filter and switching means between the filters and the RF frequency conversion module which comprises adjustable low-pass filters enable, according to the frequency of the selected channel, a first operating mode corresponding to the frequencies located in said nominal band or a second operating mode corresponding to frequencies located either in a low frequency band or in a high frequency band on either side of the nominal band to be determined.

A new architecture of the emission and reception parts of a user terminal enables very wide frequency bands around the one nominal band corresponding to the operational frequency band of the RF frequency conversion module to be addressed without degrading the performance.

According to a first embodiment the filtering element is made up of a first band-pass filter, of a second low-pass filter and of a third high-pass filter switchable by a control signal emitted by the baseband processing module, the control signal selecting the band-pass filter for operation in the first operating mode, and the high-pass filter or the low-pass filter for operation in the second operating mode.

According to a second embodiment, the filtering element is made up of a first variable low-pass filter and of a second variable high-pass filter switchable by a signal Sc1 and adjustable by control signals emitted by the baseband processing module and selecting the filters for operation in the second operating mode.

Preferentially, the low-pass filters of the RF frequency conversion module comprise a variable cut-off frequency corresponding to N times the bandwidth of a useful channel, N corresponding to the number of extended channels.

According to a variant of the invention, the high and low stop frequencies corresponding to the switching of the first operating mode to the second operating mode are determined by the baseband processing module according to the operational frequency band of the RF frequency conversion module and to the frequency of the channel to be processed.

Figure 3:
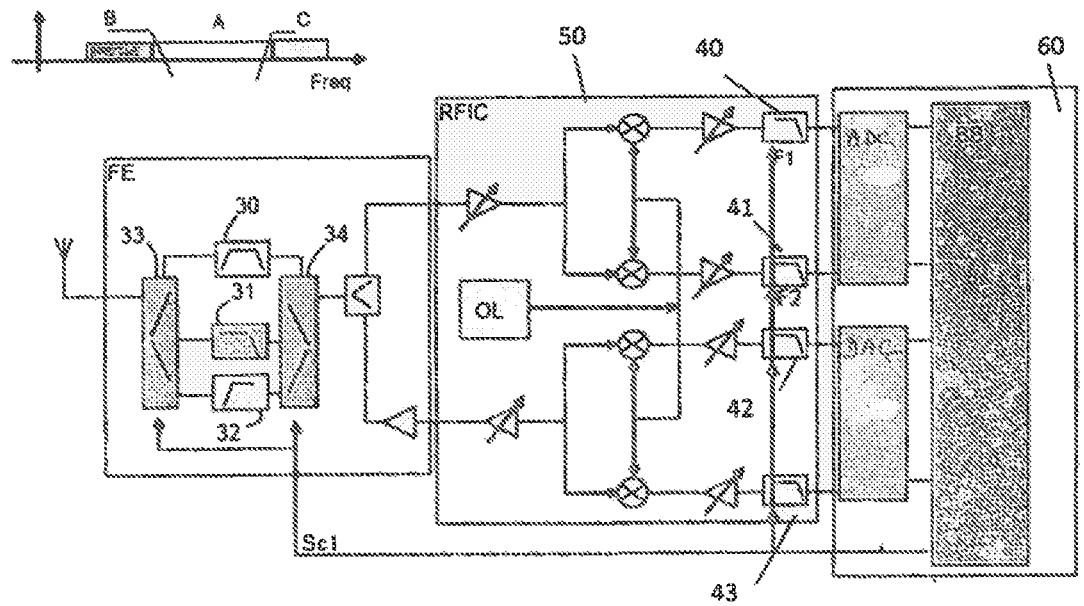
Figure 5:
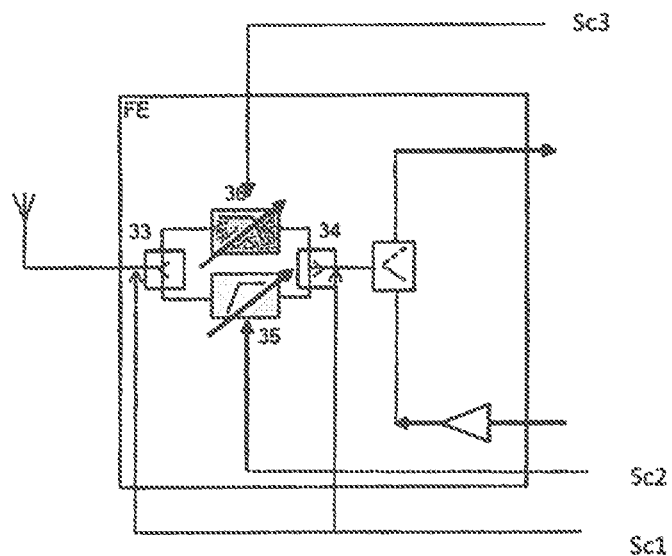
Figure 6:
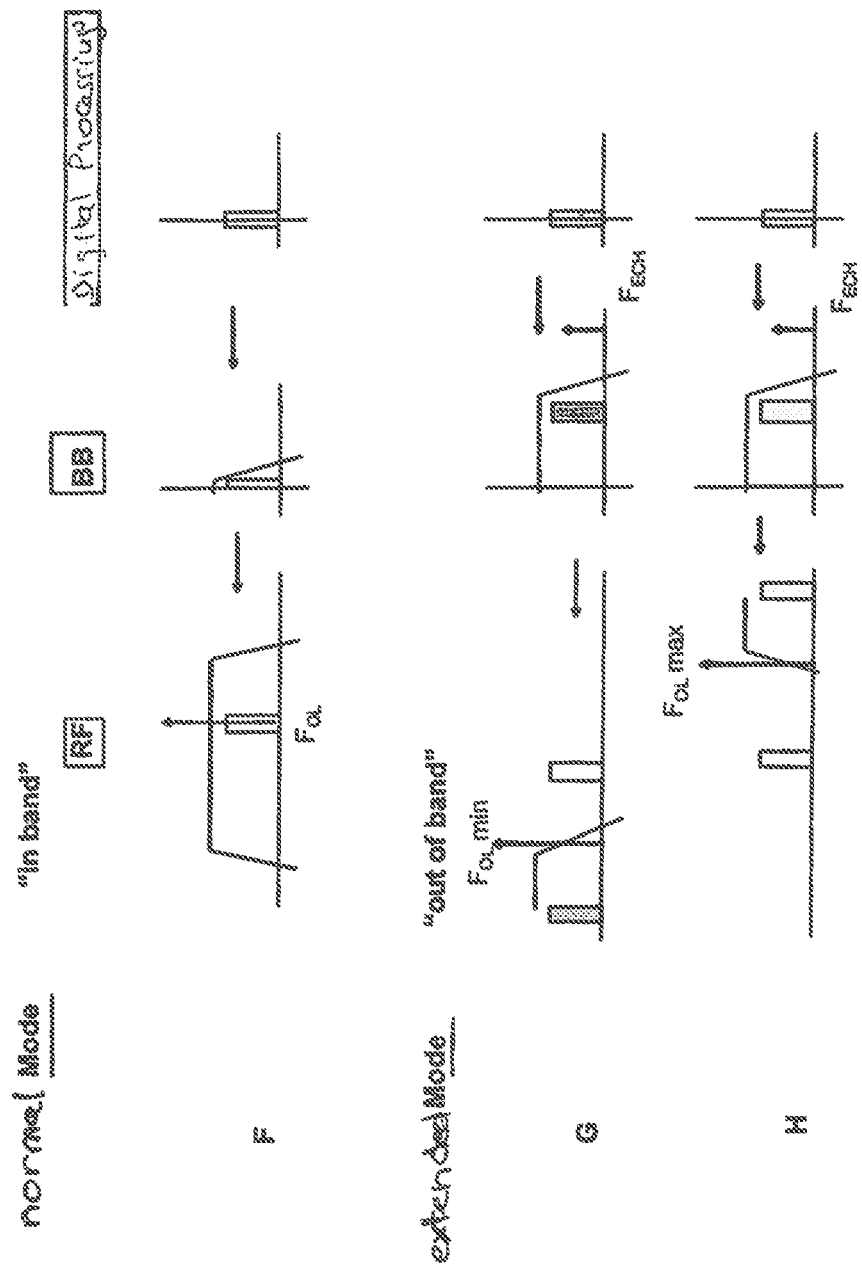

The characteristics and advantages of the aforementioned invention will emerge more clearly upon reading the following description made with reference to the drawings attached in the appendix, wherein:

FIG. 1 already described represents a multi-band terminal according to the prior art FIG. 2 already described represents a standard architecture according to the prior art of an emission/reception device with direct conversion FIG. 3 represents an architecture of an emission/reception device according to the invention FIG. 4 represents different operating modes of the device according to the invention FIG. 5 is a variant of an emission/reception device according to the invention FIG. 6 represents different operating modes of the device according to the invention in the reception mode To simplify the description, the same references will be used in these last figures to designate the elements fulfilling identical functions FIG. 3 represents the architecture of an emission/reception device according to the invention and illustrates the proposed concept which is based on the addition upstream of the RFIC 50 of switched low-pass or high-pass filters when one wants to extend the operational frequency band of the receiver, or nominal band, respectively towards high and low frequencies.

The architecture of this emission/reception device according to the invention is based on a standard architecture of an emission/reception device with direct conversion such as represented and described by FIG. 2. The additional filtering element is integrated into the front-end module FE. This filtering element is made up of an assembly formed of a band-pass filter 30, of a low-pass filter 31 and of a high-pass filter 32 connected in parallel and connected to switches 33, 34 with several positions so as to switch only one of the filters.

This filtering element is coupled to the fast Analogue-to-Digital Converter ADC by the RF frequency conversion module 50. An adjustable low-pass filtering 40-43 is integrated into the RF frequency conversion module 50 for channel filtering before sampling so as to process the information received by the baseband BB processor In this way, according to the frequency of the reception channels, this processor will indicate by a control signal Sc1 to the switches 33 and 34 and to the low-pass filters 40-43 if the operation is in the nominal band (in band) or outside this nominal band (out of band). In addition, the control signal Sc1 will make it possible to distinguish the high pass-band out of band, which means that the pass-band is in higher frequencies than those of the nominal band and the low pass-band out of band which means that the pass-band is in lower frequencies than those of the nominal band.

The principle is therefore based on three distinct operational modes which are.

The normal mode for operation in the nominal band, i.e. 'in band' operation

The high frequency extension mode for operation in higher frequencies than those of the nominal pass-band The low frequency extension mode for operation in lower frequencies than those of the nominal pass-band The high and low stop frequencies corresponding to the switching of the first operating mode, i.e. the normal mode or 'in-band' mode, to the second operating mode, i.e. the extension mode or 'out of band' mode, are determined by the baseband BB processing module according to an indication emitted by the processor depending on the operational frequency of the user terminal.

Figure 4A:
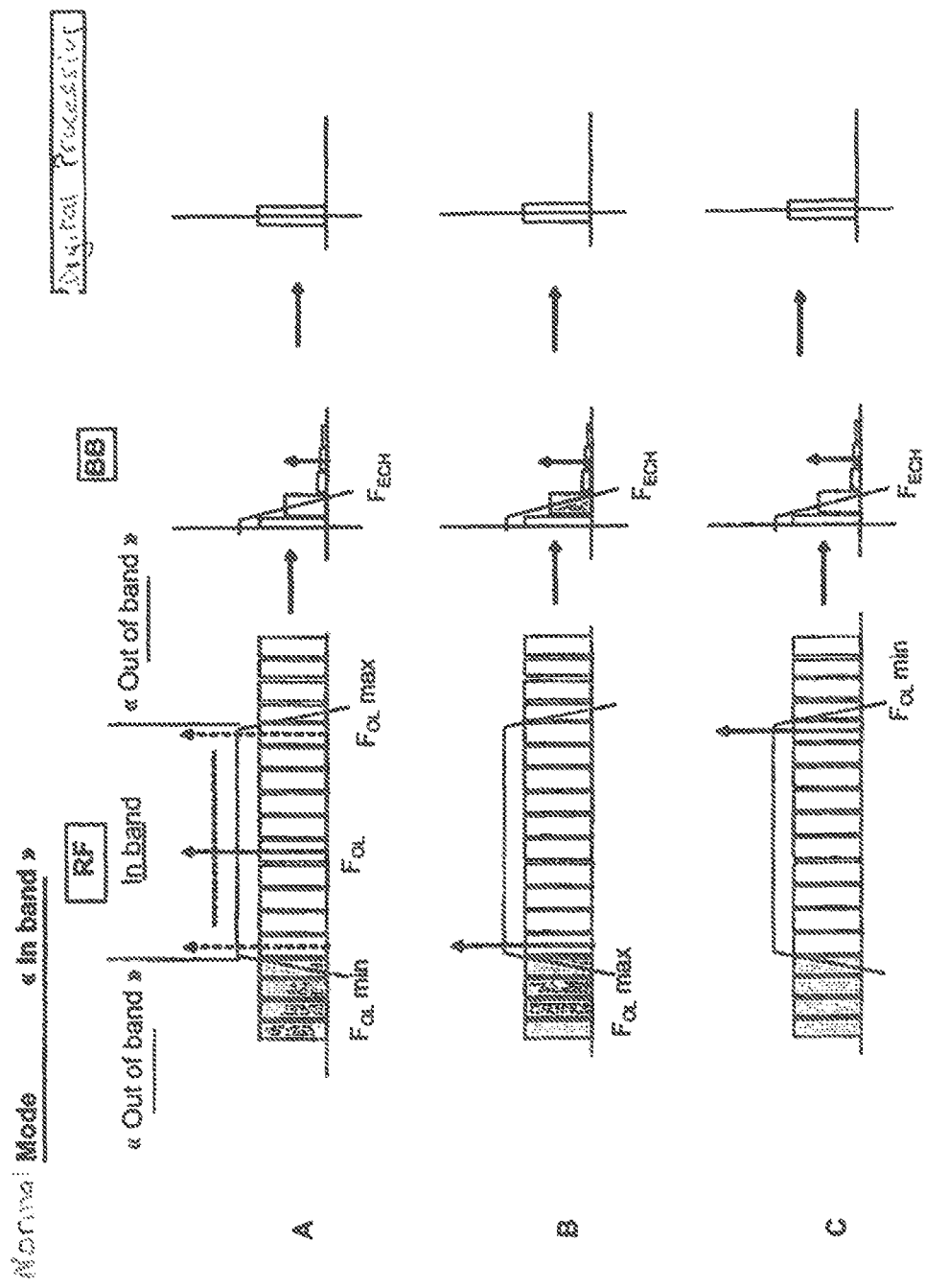

FIG. 4a illustrates these various operating modes. The normal mode or 'in-band' operation illustrated by the diagrams corresponding to lines A, B and C represents the operation in RF band then in baseband and then the digital processing, reception side, directly converting the RF selected channel in baseband BB such as represented by an arrow in solid line on the diagram.

The received signal is transposed from the RE band to the baseband to be filtered then sampled at sampling frequency $F_{ECH}$. The signal thus sampled is then processed by the digital processing unit.

in the case corresponding to line A, the frequency $F_{OL}$ of the local oscillator OL is in the middle of the normal operational band.

In the case corresponding to line B, the frequency $F_{OL}$ of the local oscillator OL is at its minimum value $F_{OL}$ min of the normal operational band In the case corresponding to line C, the frequency of the local oscillator OL is at its maximum value $F_{OL}$ max of the normal operational band.

For these 3 cases, the adjacent channels are filtered by adjustable low-pass filters 40 and 41, the control signal Sc1 for the switching of switches 33 and 34 also enables the low-pass filters 40 to 41 to be selected.

Figure 4B:
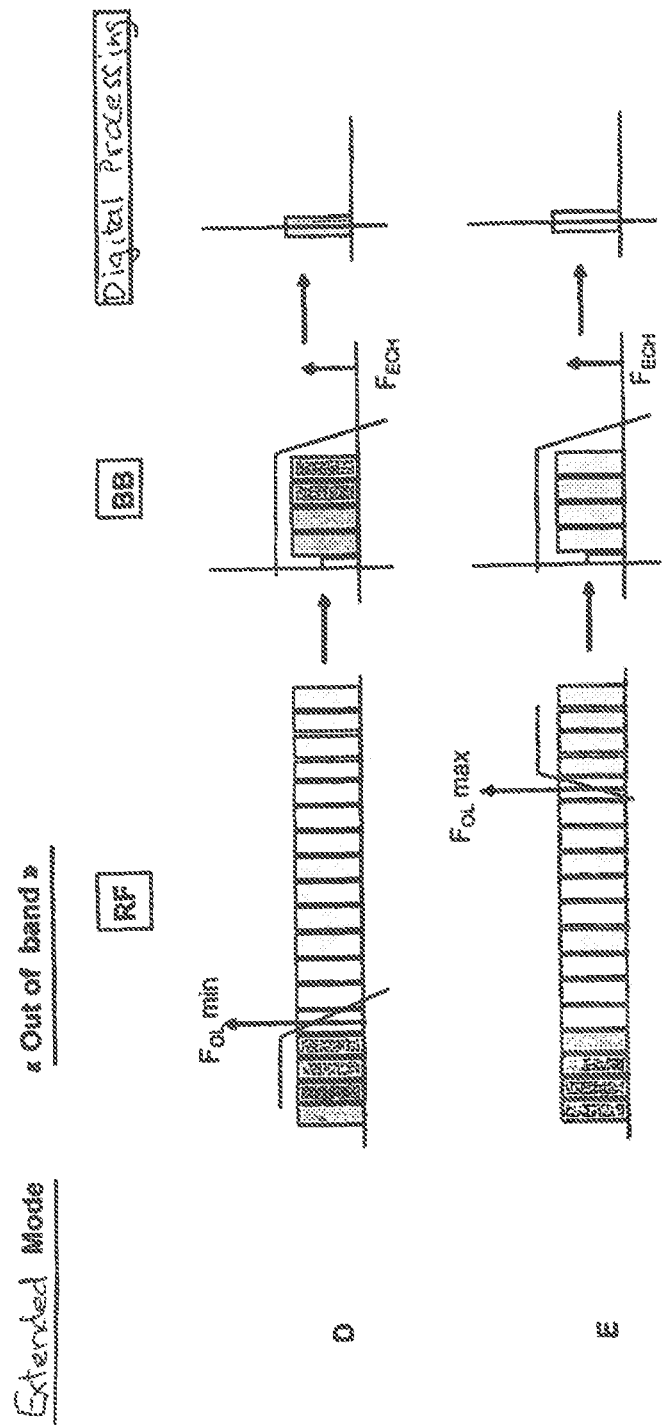

FIG. 4b illustrates by lines D and E an extended mode or operation known as 'out of band'.

In the case corresponding to line D, the frequency of the local oscillator OL is at its minimum value $F_{OL}$ min of the normal operational band. A low-pass filtering is implemented to suppress undesirable image frequency bands. The control signal Sc1 allows the switching of the switches 33 and 34 on the channel containing the low-pass filter 31 and also enables the low-pass filters 40 and 41 to be selected.

The low-pass filtering in the baseband is then de-inhibited. The sampling is made in this case at high speed and a digital processing makes it possible to select and process the useful channel among the sampled channels.

In the case corresponding to line E, the frequency of the local oscillator OL is at its maximum value $F_{OL}$ max of the normal operational band. A high-pass filtering is implemented to suppress undesirable image frequency bands. The control signal Sc1 allows switching of the switches 33 and 34 on the channel containing the high-pass filter 32. The high-pass filtering in the baseband is also de-inhibited and the sampling is also made at high speed, a digital processing allows to select and process the useful channel among the sampled channels.

The dual operation can be performed upon emission on the same principle of high-pass and low-pass RF filtering and switching at the level of the FE front-end module. In this case, a high-resolution analogue-to-digital conversion device with oversampling and interpolator filter to separate image bands is implemented.

The proposed concept also applies if the receiving frequency is different from the transmitting frequency in the case of a cellular telephone for example.

A variant proposed and illustrated on FIG. 5 consists in replacing in the front-end module FE the filtering element by another filtering element comprising a low-pass filter 36 and a high-pass filter 35 adjustable individually and controlled by the SB processor according to the required channel centre frequency. Two control signals Sc2 and Sc3 from the baseband processor enable these filters to be adjusted. The control signal Sc1 allows the switching of switches 33 and 34.

The invention can also be implemented in a dual manner upon sending by using the same filtering and frequency configurations of local oscillator OL. A signal is generated by the SB baseband processor then transposed in frequency and filtered in RE. There are also three operating modes as represented by FIG. 6 In the case of line F: the frequency of local oscillator OL $F_{OL}$ is in the normal operational band.

In the case of line G: the frequency of local oscillator OL $F_{OL}$ is at its minimum value of the normal operational band or nominal band.

In the case of line H: the frequency of local oscillator OL $F_{OL}$ is at its maximum value of the normal operational band.

Following the introduction of one of the filtering elements according to the invention, an example of the 'normal' operational frequency band corresponding to a possible operation of 2.3-2.7 GHz can be extended to a band ranging from 2 to 3 GHz, The extension is then of 0.6 GHz. The pass-band of the channels is for example of 20 MHz.

In this case, the cut-off frequencies of the low-pass and high-pass RF filters to be implemented are respectively 2.3 and 2.7 GHz. In the normal operational frequency band (case A), a band-pass filtering is implemented. The adjustable cut-off frequency of the low-pass filters 40, 41, 42, then is of 10 MHz.

Upon receiving, the sampling frequency of the analogue-to-digital converter (ADO) in 'extended' mode must be greater than 600 MHz (2*300 MHz) and the filtering in baseband BB integrated into the RFIC is then deactivated.

Upon sending, in 'extended' mode, the filtering in baseband BB integrated into the RFIC is also deactivated and the sampling frequency of the DAC must be at least of 600 MHz. In addition to the 'normal' operational band between 2.3 and 2.7 GHz where the ADO converter generates a baseband signal centred on 0, the most advanced mode will enable any useful channel with frequencies located between 2 and 2.3 GHz and between 2.7 and 3 GHz to be addressed.

The invention claimed is:

1. Wideband emission/reception device comprising
a front-end module,
a RF frequency conversion module, and
a baseband processing module, for the emission or the reception of signals in a selected channel, wherein
the baseband processing module provides a control signal to indicate, according to a frequency of the selected channel, a first operating mode within a nominal band corresponding to frequencies located within the nominal band or a second operating mode outside the nominal band corresponding to frequencies located either in a low frequency band or in a high frequency band on either side of the nominal band,
the RF frequency conversion module comprises adjustable low-pass filters operable, according to the control signal, in the first operating mode or the second operating mode, and
the front-end module comprises filtering elements and a switching device between the filtering elements to switch, based on the control signal, one of the filtering elements for operation, in the first operating mode or in the second operating mode, the filtering elements comprise a first band-pass filter, a second low-pass filter and a third high-pass filter switchable by the control signal emitted by the baseband processing module, the control signal selecting the band-pass filter for operation in the first operating mode, and the high-pass filter or the low-pass filter for operation in the second operating mode.

2. Emission/reception device according to claim 1 wherein the low-pass filters comprise a variable cut-off frequency corresponding to N times the bandwidth of a selected channel, N corresponding to the number of channels of the frequencies located out of the nominal band either in the low frequency band or in the high frequency band.

3. Emission/reception device according to claim 1, wherein high and low stop frequencies corresponding to switching of the first operating mode to the second operating mode are determined by the baseband processing module according to an operational frequency band of an RFIC circuit and to a frequency of a channel to be processed.

4. Wideband emission/reception device comprising
a front-end module,
a RF frequency conversion module, and
a baseband processing module, for the emission or the reception of signals in a selected channel, wherein
the baseband processing module provides a control signal to indicate, according to a frequency of the selected channel, a first operating mode within a nominal band corresponding to frequencies located within the nominal band or a second operating mode outside the nominal band corresponding to frequencies located either in a low frequency band or in a high frequency band on either side of the nominal band,
the RF frequency conversion module comprises adjustable low-pass filters operable, according to the control signal, in the first operating mode or the second operating mode, and
the front-end module comprises filtering elements and a switching device between the filtering elements to switch, based on the control signal, one of the filtering elements for operation, in the first operating mode or in the second operating mode, wherein the filtering elements comprise a first variable low-pass filter and a second variable high-pass filter switchable by the control signal for selection of the filters for operation in the second operating mode and adjustable by further control signals emitted by the baseband processing module.

5. Emission/reception device according to claim 4 wherein the low-pass filters comprise a variable cut-off frequency corresponding to N times the bandwidth of a selected channel, N corresponding to the number of channels of the frequencies located out of the nominal band either in the low frequency band or in the high frequency band.

6. A method of emission or reception of signals in a selected channel, comprising
emitting or receiving signals in a selected channel;
providing, by a baseband processing module, a control signal to indicate, according to a frequency of the selected channel, a first operating mode within a nominal band corresponding to frequencies located within the nominal band or a second operating mode outside the nominal band corresponding to frequencies located either in a low frequency band or in a high frequency band on either side of the nominal band;
selecting, in a front end module, one of a band-pass filter for operation in the first operating mode, and a filtering element for operation in the second operating mode; and
switching, based on the control signal, between adjustable low pass filters in an RF frequency conversion module operable in the first operating mode or in the second operating mode.

7. The method according to claim 6, wherein the filtering element includes a first variable low-pass filter and a second variable high-pass filter, and further comprising selecting one of the first variable low-pass filter and the second variable high-pass filter in response to the control signal for operation in the second operating mode; and adjusting the selected one of the first variable low-pass filter and second variable high-pass filter by the control signals.

8. The method according to claim 7, wherein the variable low-pass filter includes a variable cut-off frequency corresponding to N times a bandwidth of a selected channel, N corresponding to the number of channels of the frequencies located out of the nominal band either in the low frequency band or in the high frequency band.

9. The method according to claim 8, wherein the cut-off frequency of the low-pass filter is varied corresponding to N times the bandwidth of a selected channel, N corresponding to the number of channels of the frequencies located out of the nominal band either in the low frequency band or in the high frequency band.

10. The method according to claim 6, further comprising determining high and low stop frequencies corresponding to switching of the first operating mode to the second operating mode by the baseband processing module according to an operational frequency band of an RFIC circuit and to a frequency of a channel to be processed.

* * * * *